United States Patent [19]
Kirkwood

[11] 3,723,216
[45] Mar. 27, 1973

[54] METHOD OF MAKING EXPANSIBLE SEAL FOR VALVES

[76] Inventor: Creal E. Kirkwood, 3237 North Lewis, Tulsa, Okla.

[22] Filed: Aug. 25, 1971

[21] Appl. No.: 174,717

[52] U.S. Cl. ................156/110, 156/158, 156/250, 277/164
[51] Int. Cl. .........................B29c 27/00, B29h 7/04
[58] Field of Search.............156/110, 158, 250, 120; 277/164

[56] References Cited

UNITED STATES PATENTS

| 586,352 | 7/1897 | Chamberlain | 156/120 |
| 1,747,533 | 2/1930 | Sessions | 156/110 |
| 3,634,167 | 1/1972 | Plontke | 156/158 |

FOREIGN PATENTS OR APPLICATIONS 582,371  9/1958  Italy ......................................156/158

*Primary Examiner*—Joseph R. Leclair
*Assistant Examiner*—Robert I. Smith
*Attorney*—James R. Head et al.

[57] ABSTRACT

An expandable seal for valves, the seal having a closed resilient tubular loop of expandable material, the loop having an opening therein, and a resilient tubular leader integrally formed with the loop communicating with the opening. The invention also includes the method of manufacturing an expandable seal by means of a sequency of steps utilizing mandrels and a heated platten for forming a length of expandable tubing into a closed loop having an integral leader extending therefrom.

4 Claims, 7 Drawing Figures

INVETORS
CREAL E. KIRKWOOD
BY
Head & Johnson
ATTORNEYS

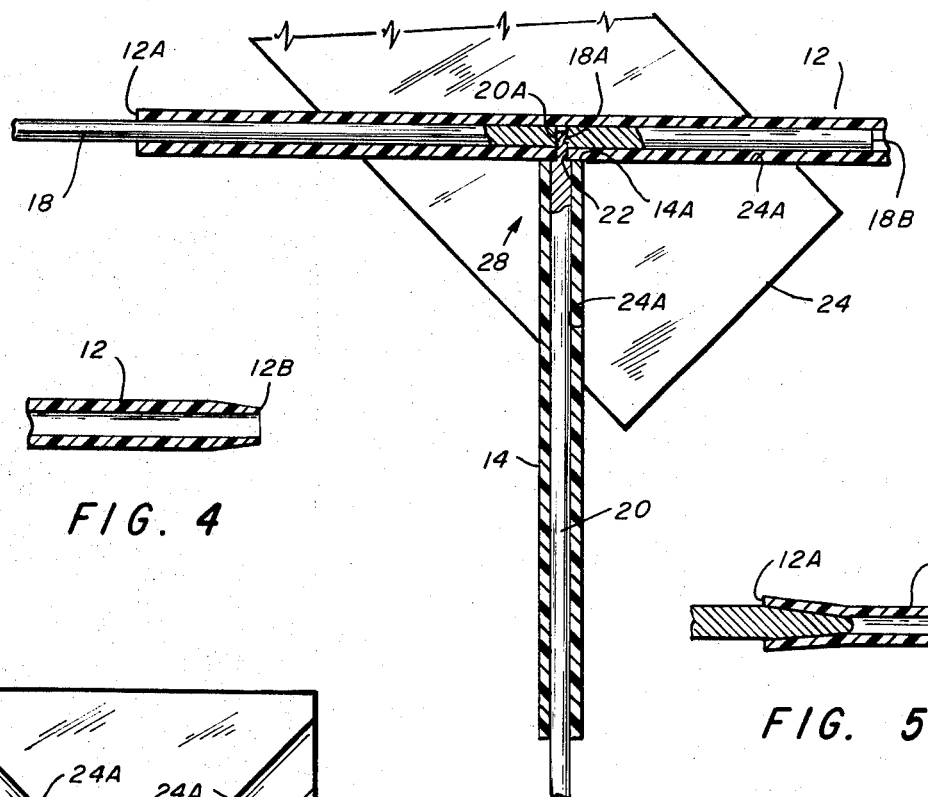
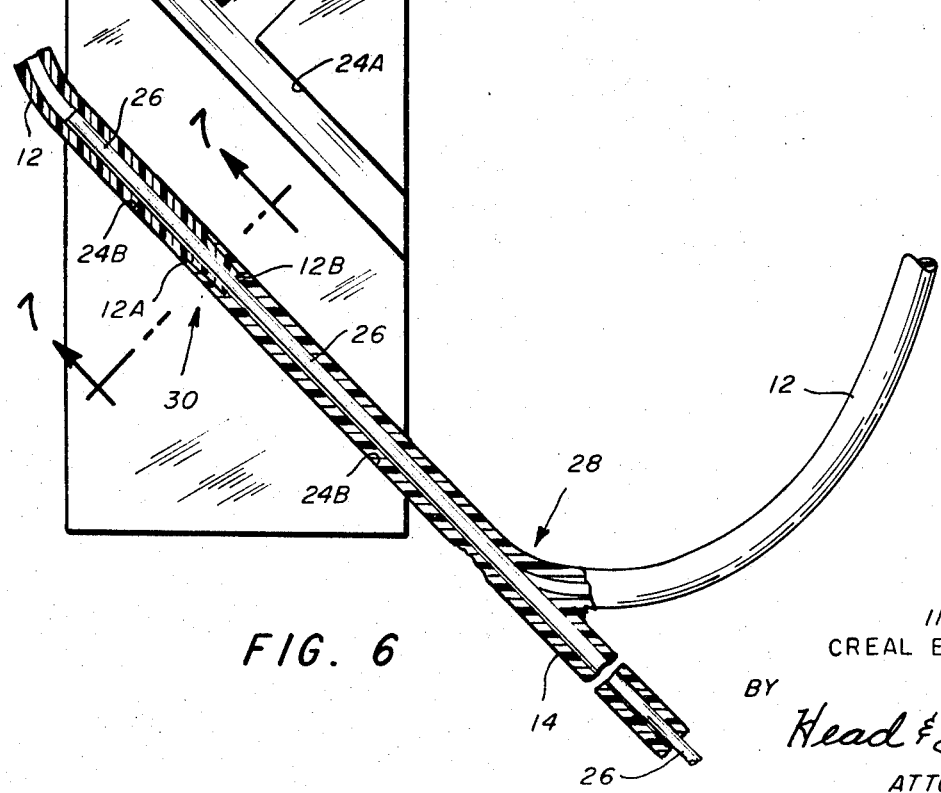

METHOD OF MAKING EXPANSIBLE SEAL FOR VALVES

BACKGROUND, SUMMARY AND OBJECTS OF THE INVENTION

In my copending U.S. Pat. Ser. No. 63,236, entitled, VALVE HAVING EXPANDABLE SEALING MEANS filed Aug. 12, 1970, I have disclosed a valve arrangement wherein a single length of expandable tubing is utilized to form an expandable seal in a multi-port valve. In my copending U.S. Pat. application, Ser. No. 86,114, filed Nov. 2, 1970, entitled, EXPANDABLE SEAL GATE VALVE, I have described a gate valve arrangement including the utilization of a single length of expandable tubing for providing an expandable seal gate valve. In these disclosures, each of which utilizes a single length of expandable tubing, it is necessary to provide at one place or another in the valve sealing surface a cross-over or parallel arrangement of the expandable tubing to obtain a complete seal. While the inventions described in the above two mentioned disclosures function successfully, nevertheless the arrangement of a single length of tubing provides an uninterrupted expandable seating surface which includes some difficulties in manufacture and in maintaining complete integrity of the sealing surface.

The present invention is directed towards an expandable seal for use in valves, the uniqueness of the seal of this invention being that there is no requirement that the expandable seal cross over itself or run parallel to itself in order to provide an uninterrupted expandable seating surface. In essence, the invention includes the provision of an expandable seal for use in a valve including a closed resilient tubular loop and a resilient tubular leader integrally formed with the loop and communicating with it.

More particularly, the invention provides a means of manufacturing an expandable seal for use in valves, the seal including a closed loop and integral leader extending therefrom.

It is therefore an object of this invention to provide an expandable seal for use in valves.

More particularly, an object of this invention is to provide an expandable seal for use in a valve including a closed resilient tubular loop and an integral resilient tubular leader extending therefrom.

Still more particularly, an object of this invention is to provide a method of manufacturing an expandable seal for use in a valve.

These objects, as well as other objects of the invention will be fulfilled in the following description and claims, taken in conjunction with the attached drawings.

DESCRIPTION OF VIEWS

FIG. 3 is a top view of portions of a resilient expandable seal in one stage of manufacture showing the seal in cross section and showing the portions positioned in the bottom half of a heated platten, the top half of the platten not being shown.

FIG. 4 is a cross-sectional view of a first end of a length of tubing used to form a closed loop 5 having preparation of the end for bonding to the loop second end.

FIG. 5 is a cross-sectional view of a second end of a length of tubing used to form a closed loop 5 being prepared for an overlap joint by a tool.

FIG. 6 is a top view of portions of an expandable seal in one of the steps of manufacture, the seal being shown partially in cross section and being shown positioned in the bottom half of a heated platten.

DETAILED DESCRIPTION

Figure 1:
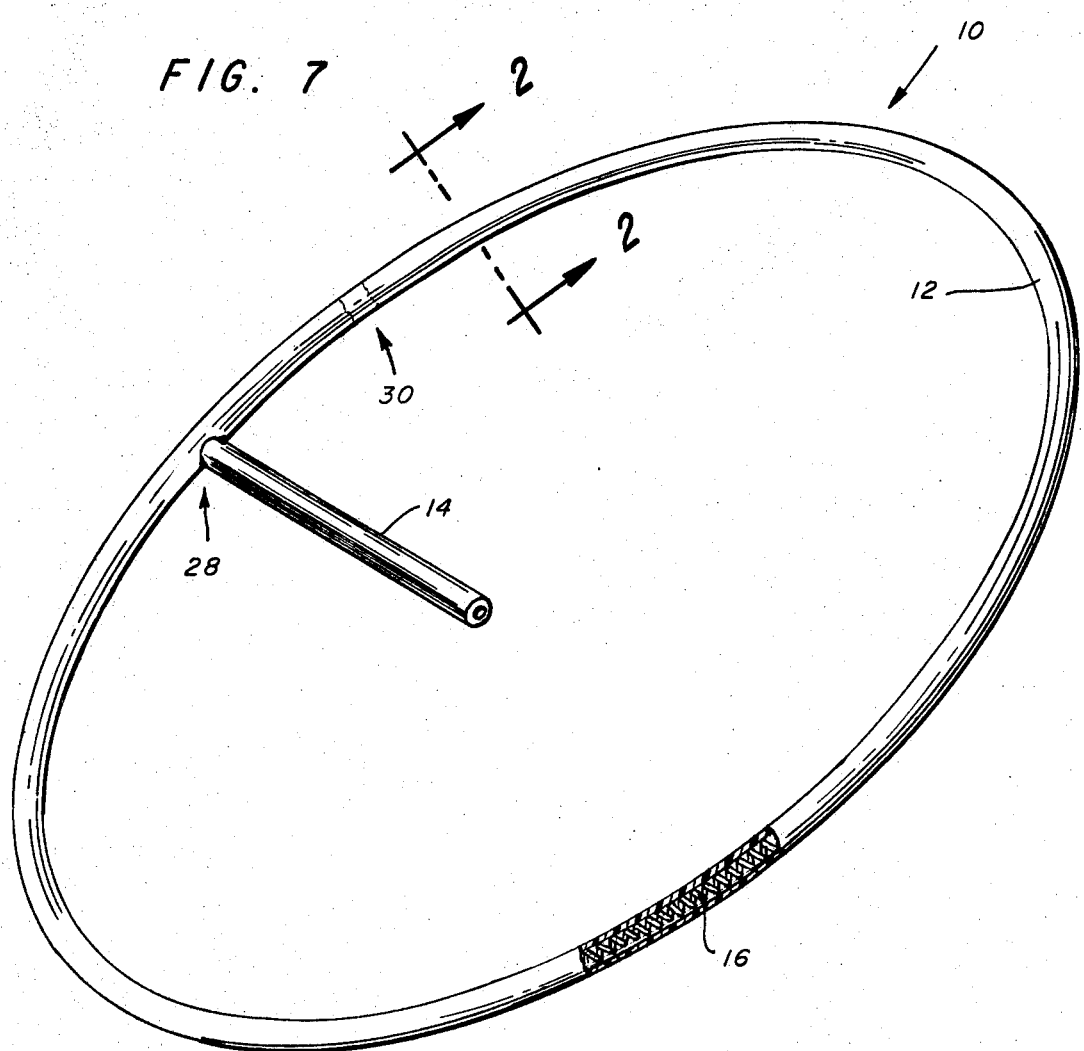
FIG. 1 is a isometric view of an expandable seal of this invention shown partially cut away.

Referring now to the drawings and first to FIG. 1, an expandable seal for use in a valve is shown in isometric view. The seal, generally indicated by the numeral 10, includes a closed resilient tubular looped portion 12 and a resilient tubular leader 14 integrally formed with the loop portion and extending from it. The leader portion 14 communicates with the interior of the loop portion 12 through an opening in the loop portion 12, the opening not being shown in FIG. 1.

The seal as shown in FIG. 1 may be utilized in a variety of ways to provide an expandable seal for a valve. Reference may be had to my copending application entitled MULTI-PORT VALVE HAVING EXPANDABLE SEALING MEANS filed concurrently herewith as an example of a valve utilizing a seal of the type illustrated in FIG. 1.

The seal of FIG. 1 may be utilized in gate valves, plug valves, ball valves, single port valves, dual port valves and multi-port valves. All that is required is that a groove is formed in one of the sealing surfaces in the valve to receive the closed loop 12. The leader portion 14 extends in a direction away from the sealing surface in a port or passageway communicating with the exterior of the valve whereby fluid pressure may be applied to cause the loop portion 12 to expand to make sealing contact with another portion of the valve to effect leak-proof closure of the valve.

In some instances it is desirable that means be provided to prevent the inadvertent collapse of the resilient tubular loop portion 12 and leader portion 14. To obtain this goal a flexible coiled spring 16 may be positioned within the seal. In some instances it will be desired that the spring 16 be placed only in the loop portion 12, or only in part of loop portion 12. In other instances it will be desired that coil spring 16 extend as well in leader portion 14 but it is to be understood that the use of coil spring 16 is optional and the use will be predicated by the specific application of the seal.

METHOD OF MANUFACTURE

The seal of FIG. 1 is manufactured following a sequence of steps from a single length of tubing. The tubing must be resilient, expandable, heat fusible and inert to the fluid or gas, products in which the seal is to be used. Urethane is a good example of a product meeting these requirements for most applications. Other plastics and natural rubber may also be used.

The steps of manufacture are as follows:

1. Tubing is cut into the length required to form closed loop portion 12. The length of portion loop 12 must normally be accurately dimensioned so that the seal completed fits in the groove in the valve in which it is to be employed without the necessity of stretching the loop or compacting it.

2. A length of tubing is cut to form the leader portion 14. The length of leader portion 14 will be determined by that required for the specific application of the seal and must be sufficient to extend into a passageway wherein hydraulic pressure may be applied. In some instances it will be desired that the leader portion 14 extend to the exterior of the valve. The length of leader 14 is not as critical as is the loop portion 12 since extra length may be cut off as desired at the tint the seal is installed in a valve.

3. A first metallic cylindrical mandrel is inserted into end 18 of loop portion 12 (See FIG. 3). Mandrel 18 preferably has a small diameter opening 18A at a point spaced from the inner end 18B.

4. A second mandrel 20 is inserted into tubular leader portion 14. Mandrels 18 and 20 each have a diameter substantially equal to the interior diameter of the tubing of which the seal is formed. In the illustrated arrangement second mandrel 20 has a reduced diameter end portion 20A which extends through loop portion 12 to form a small diameter opening 22, the end portion 20A being received in the opening 18A in first mandrel 18. Opening 22 in loop portion 12 may be first formed by cutting or drilling rather than by means of punching with second mandrel end portion 20A.

5. The inner end 14A of leader 14 is contacted with loop portion 12. The extension of the reduced diameter portion 20A of second mandrel 20 into opening 18A in first mandrel 18 serves to retain the mandrels and the tubular material in proper relationship with each other.

6. The temperature of the tubing at the area of intersection of portion 12 and 14 is raised so that the tubing portions are bonded to each other to form a T-shaped junction, generally indicated by the numeral 28. The best means of securing this step is by placing the portions forming the intersection 28 between heated plattens.

7. After the joined tubing has been bonded together, mandrels 18 and 20 are removed.

8. In order to complete the loop, portion end 12A must be bonded to the opposite end 12B. For this purpose a third metallic mandrel 26 is inserted through the joined leader portion 14 past the junction 28 of the leader portion with the loop portion 12 and past the end 12 of the loop portion. Third mandrel 26, like mandrels 18 and 20, is cylindrical, and has an exterior diameter equal the interior diameter of the tubular material.

9. The end 12B of loop portion 12 is inserted over the end of mandrel 26 to contact end portion 12A, thus completely the loop 12, as shown in FIG. 6.

10. The area of contact between the loop ends 12A and 12B forms a junction, generally indicated by the numeral 30, and this junction, having third mandrel 26 therein, is heated. In the preferred arrangement, heating of junction 30 is accomplished by positioning the tubing forming the junction between halves of a bifurcated heated platten, each portion of the platten having a semicircular cross-section groove 24B therein. (See FIG. 6 and FIG. 7) The heated platten causes the portions of the tubing at junction 30 to bond together.

11. The final step is the removal of third mandrel 26. The expandable seal of the invention is finished and in the finished form is a unitary element all of expandable material, having the appearance of FIG. 1.

The steps above enumerated are not necessarily practiced in exactly the sequence set out, and some of the steps may be combined with others or additional steps may be added.

Figure 7:
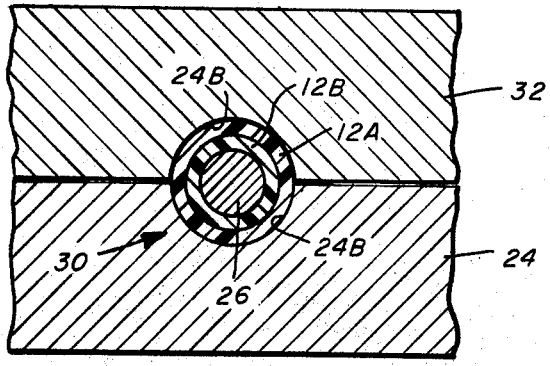
FIG. 7 is a cross-sectional view taken along the line 7—7 of FIG. 6 showing both halves of a heated platten surrounding the tubular seal in the process of bonding the ends together to form the closed loop.
Figure 2:
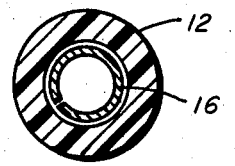
FIG. 2 is a cross-sectional view taken along the line 2—2 of FIG. 1.

In order to improve the effectiveness of junction 30 and to add to the strength to the loop portion 12 of the completed seal, the end portion 12B may be externally tapered as shown in FIG. 5. The tapered arrangement, as shown in FIG. 5, provides a short overlap to afford increased strength of the fused joint. The cross-sectional view of FIG. 7 shows the overlap tapered portions 12A and 12B with mandrel 26 therein. This figure also shows lower platten 26 mated against an upper platten 32 by which the juncture 30 is heated. As shown in FIG. 6 the lower portion 24 of the heated platten is formed with grooves 24A as used in forming junction 28 and groove 24B as used in forming junction 30. In this way a single set of heated mated plattens may be used to form both junctions required for the manufacture of a seal. The plattens of 24 and 32 are typically heated by electrical means well known in the art.

While the invention has been described with a certain degree of particularity, it is manifest that many changes may be made in the details of construction and the arrangement of components without departing from the spirit and scope of this disclosure. It is understood that the invention is not limited to the embodiment set forth herein nor to the specific sequence of steps in practicing the method of manufacture of the invention, but the invention is to be limited only by the scope of the following claim or claims, including the full range of equivalency to which each element or step thereof is entitled.

What is claimed:

1. A method of manufacturing an expandable seal for use such as in a valve, comprising the steps of:
   1. cutting a resilient tube to obtain a first length required to form a closed loop of a desired dimension;
   2. cutting a resilient tube to obtain a second length required to form a leader of the desired length;
   3. inserting a first metallic cylindrical mandrel into one end of said first length of tubing, the first mandrel having a diameter substantially equal the internal diameter of said first length of tubing;
   4. inserting a second metallic cylindrical mandrel into said second length of tubing;
   5. contacting one end of said second length of tubing having said second mandrel therein against said first length of tubing having said first mandrel therein at a point adjacent to and spaced from the first end of said first length of tubing;
   6. raising the temperature of said first and second lengths of tubing at the area of contact thereof to fuse said second length of tubing to said first length of tubing;
   7. removing said first and second mandrels;
   8. forming an opening in said first length of tubing at the intersection with said second length of tubing;
   9. inserting a third metallic mandrel through said second length of tubing, through said opening in said first length of tubing and beyond the first end thereof;

10. inserting the second end of said first length of tubing over said third mandrel extending beyond the first end and contacting the first and second ends of said first length of tubing;
11. raising the temperature of said first length of tubing at the area of contact of said two ends thereof to fuse said ends together; and
12. removing said third mandrel.

2. A method of manufacturing an expandable seal according to claim 1. wherein step (6) includes positioning portions of said first and second length of tubing at the area of contact thereof between heated platten portions.

3. A method of manufacturing an expandable seal according to claim 1. wherein step (11) includes placing said first length of tubing at the area of contact of the two ends thereof between heated platten portions.

4. A method of manufacturing an expandable seal according to claim 1. including the steps of forming an external taper at one of said ends of said first length of tubing and an internal taper at the other said end of said first length of tubing before said ends are contacted in step (10).

* * * * *